J. C. RANCK.
GAGE WHEEL FOR GARDEN RAKES.
APPLICATION FILED NOV. 27, 1917.
1,314,365.                                              Patented Aug. 26, 1919.
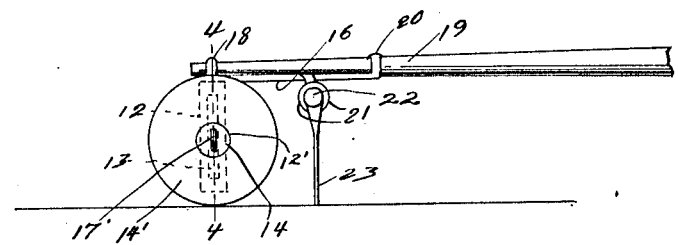
Fig. 1
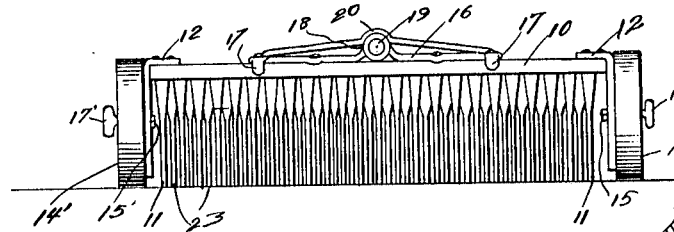
Fig. 2
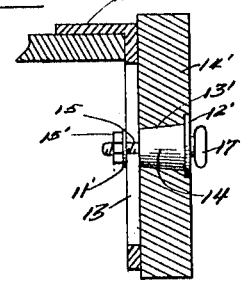
Fig. 4
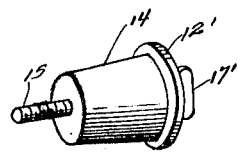
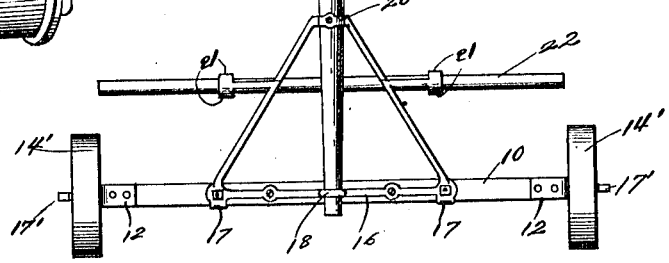
Fig. 3
Fig. 5
Witnesses
Inventor
J. C. Ranck
By
Attorneys

UNITED STATES PATENT OFFICE.

JAMES C. RANCK, OF ELMIRA, NEW YORK.

GAGE-WHEEL FOR GARDEN-RAKES.

1,314,365. Specification of Letters Patent. Patented Aug. 26, 1919.

Application filed November 27, 1917. Serial No. 204,221.

*To all whom it may concern:*

Be it known that I, JAMES C. RANCK, a citizen of the United States, residing at Elmira, in the county of Chemung, State of New York, have invented certain new and useful Improvements in Gage-Wheels for Garden-Rakes; and I do hereby declare the following to be a full, clear, and exact description of the invention, such as will enable others skilled in the art to which it appertains to make and use the same.

This invention relates to improvements in garden rakes and particularly to hand rakes.

One object of the present invention is to provide a device of this character which is so constructed and arranged that danger of tearing the grass and soil of a lawn is obviated in a novel and efficient manner.

Another object is to provide a device of this character which includes novel and improved means for attaching ground engaging supporting wheels on the bar of the rake.

Other objects and advantages will be apparent from the following description when taken in connection with the accompanying drawing.

In the drawing:

Figure 1 is a side elevation of a garden rake of the self cleaning type equipped with my supporting wheels.

Fig. 2 is a front elevation of the same.

Fig. 3 is a top plan view of the rake.

Fig. 4 is an enlarged vertical sectional view taken on the line 4—4 of Fig. 1.

Fig. 5 is a perspective view of one of the hub members removed from the wheel.

Referring particularly to the accompanying drawing, 10 represents the main rake tooth bar which carries the teeth 11. On each end of the bar 10 there is secured an L-shaped plate 12, the horizontal portion of which is secured to the upper face of the end of the bar while the vertical portion depends outwardly of the endmost tooth of the bar. Each of the downwardly extending portions of the L-shaped members is formed with a longitudinal slot 13. A ground engaging wheel 14' is provided with a central opening 13' into which is inserted the hub member 14. This hub member is provided with a peripheral flange 12' at its outer end to prevent movement of the hub through the opening 13' in one direction. Formed integrally on the central portion of the other end of the hub is a threaded stem 15' which is adapted to pass through the slot 13 of the L-shaped member and receive thereon the washer 11', and the clamping nut 15'. The nut clamps the depending portion of the member 12 between the washer and the adjacent end of the hub, whereby said hub is held firmly in a position at right angles to the said slotted portion of the member 12. A finger-piece 17' is formed on the flanged end of the hub member whereby the same is capable of being held while the nut is being applied or removed.

It will thus be seen that the wheels support the rake in such position with respect to the ground that the teeth cannot dig deeply into the soil, but will be permitted to perform their proper function of raking.

Secured to the intermediate part of the bar 10 is a triangular frame 16 the ends of which are formed with the gripping fingers 17 which embrace and are secured to the bar 10. A bar 22 is disposed rearwardly of the bar 10 and carries the teeth 23 which are arranged to pass between the teeth 11 on rearward movement of the rake to remove therefrom the material which has been raked by said teeth 11. The frame 16 is formed with the eye members 18 and 20 for the reception of the handle 19 therethrough. Fingers 21 loosely grip the bar 22, intermediate the teeth thereof so that said bar is free to rotate within said fingers in the performance of the function above-mentioned.

The specific structure of the rake is only given to permit of a more clear understanding of the particular type of rake with which my invention is used. It will, of course, be understood that the wheels can be as readily applied to any ordinary rake with the same beneficial results.

What is claimed is:

The combination with a slotted standard, of a wheel having a tapering opening through the center thereof, the outer end of the opening being countersunk, a hub member which tapers longitudinally disposed in said opening, the smaller end of the hub being provided with a reduced threaded portion engaged in the slotted member, a nut for holding the threaded portion in the slotted member, the larger end of the hub being formed with a circumferential flange seated in said countersunk end of the wheel opening, and an outwardly extending and flattened finger-grip formed on the larger end of the hub to hold the hub against rotation when the nut is turned.

In testimony whereof, I affix my signature in the presence of two witnesses.

JAMES C. RANCK.

Witnesses:
E. E. REYNOLDS,
M. E. DUNBAR.

Copies of this patent may be obtained for five cents each, by addressing the "Commissioner of Patents, Washington, D. C."